Patented Feb. 5, 1952

2,584,894

UNITED STATES PATENT OFFICE 2,584,894

TREATMENT OF FLUORIC EFFLUENTS TO OBTAIN MAGNESIUM SILICOFLUORIDE AND/OR HYDROFLUORIC ACID

Walter H. MacIntire, Knoxville, Tenn., assignor to American Zinc, Lead & Smelting Company, St. Louis, Mo., a corporation of Maine No Drawing. Application October 28, 1949, Serial No. 124,258

9 Claims. (Cl. 23—88)

This invention relates to the utilization of mineral magnesium silicates, such as olivine and serpentine, for the collection and recovery of fluoric effluents from various industrial processes in the form of magnesium silicofluoride, or fluosilicate, which is useful per se or as a raw material for the production of hydrofluoric acid, preferably in the anhydrous state.

It is well known that fluoric materials are evolved in many major industrial operations, most important of which are probably the manufacture of fertilizers, steel, and aluminum. Governed by the nature of the operation and the materials used, fluorine is evolved in the form of silicon tetrafluoride ($SiF_4$), as hydrofluosilicic acid ($H_2SiF_6$), and as hydrofluoric acid ($H_2F_2$, usually referred to as HF). The dispersion of such effluents into the atmosphere, even in relatively small amounts, tends to create a hazard to health and may result in serious injury to plant content, plant life and animal life and especially to horticultural and floral vegetation. The problem long has been recognized by the fertilizer industry which, over many years, has sought to diminish contamination of the atmosphere at points where superphosphate is manufactured by the passing of the effluent gases through scrubbing towers in contact with water and discharging the wash water through a marble or limestone-lined ditch. Recently, the greatly expanded production of aluminum from refined bauxite and the increasing manufacture of phosphatic products have produced much larger quantities of fluoric effluents, thus aggravating the problem of preventing contamination. Meanwhile the growing use of fluoric materials in the ceramic industry, in the oil industry, in the manufacture of heavy metals, and in the processing of uranium has resulted in a need for large quantities of fluorides. It is therefore important to provide an effective, economic procedure for the collection of fluoric effluents, through the use of raw materials that are available in large quantities at low cost, and for the production of fluorinated products that can be handled easily and are useful as such or can be converted readily to other useful products such as hydrofluoric acid, a product essential to the chemistry of the major industries mentioned above.

The present invention affords a solution to the above-mentioned problem through the use of mineral silicates of magnesium. It is known that these occur in immense quantities as deposits of forsterite olivine in North Carolina and Georgia, and also in similar deposits at other locations. In North Carolina these olivine deposits contain 75–95% of forsterite (magnesium silicate) and 45–50% of magnesia, together with small amounts of other elements such as iron, chromium, aluminum, etc. In some cases degradation of olivine has altered it to serpentine and to steatite, both of which are hydrated forms of magnesium silicates. For the purposes of the present invention, these mineral magnesium silicates can be used in their naturally occurring forms. However, if a hydrated form such as serpentine or steatite is calcined to drive off its water of hydration, the mineral is rendered granular and more reactive.

The several reactions that may take place to effect the collection of the fluoric effluents are represented most simply by the following equations:

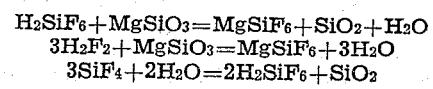

When such magnesium silicate minerals are used in the collection of fluoric effluents, the reactions take place readily and the predominant resultant is magnesium silicofluoride or fluosilicate ($MgSiF_6$), although there also may be some formation of magnesium fluoride. This product can be recovered in solid form in which magnesium silicofluoride hexahydrate predominates, together with the liberated silica and some unreacted magnesium silicate and impurities. However, one of the important advantages of the present invention is that magnesium silicofluoride has a high degree of solubility, as compared with the fluorides of magnesium and calcium. In contrast to calcium fluoride, for example, which has a solubility of only 16 P. P. M. in water, magnesium fluosilicate has a solubility of 23 parts in 100 parts of water at 20° C. and of 60 parts in 100 parts of water at 60° C. Accordingly the solid material mentioned above can be leached, or sufficient water can be provided during the absorption of the fluoric effluents, so as to produce an aqueous solution of magnesium silicofluoride from which water-soluble impurities can be removed and relatively pure crystalline magnesium silicofluoride hexahydrate obtained. Furthermore, any of the above products can be heated in the presence of concentrated sulfuric acid to produce hydrofluoric acid.

For purposes of illustration, the invention is described hereinafter in connection with the manufacture of superphosphate, but it is to be understood that this embodiment of the invention is by way of example only and is not to be taken as a definition of the limits of the invention, reference being had to the appended claims for this purpose. When phosphate rock, comprised chiefly of fluorapatite, is acidulated with sulfuric acid in the making of superphosphate, the fluoric effluents may include hydrofluoric acid, hydrofluosilicic acid, and silicon tetrafluoride. The effluents are passed upwardly or channeled laterally through a charge, or bed, of crushed magnesium silicate mineral in any suitable manner to bring the fluoric effluents into good contact with the mineral. The lumps should be sized to permit the ready passage of the gases while serving to remove the fluorine content of the effluents. Experience will serve to establish in each case the most efficacious relationship between the volume of effluents and the concentration of fluoric compounds therein, in relation to the proper sizing and depth of the charge of the magnesium silicate mineral, and the replenishment of the latter in a continuous operation. By way of example, a tower is charged with a layer from six to eight feet in thickness, the particle size varying from 1" to 2½" in diameter.

Under conditions of minimal moisture in the effluents, a mixture of the generated $MgSiF_6$ and the liberated $SiO_2$ can be collected in solid form. For example, the charge can be subjected to vibration and the solid mixture collected by gravity or the reacted material can be extracted or treated in any other manner suitable for the intended purpose. The impure solid material can be used as such for various purposes, for example, as a poisonous compound for the control of rodents and insects, as a source material for the production of hydrofluoric acid, etc. If a fluoric material of greater concentration is desired, the relatively high solubility of the magnesium fluosilicate is such that the crude solid reaction product can be leached with water so as to form a solution which can be purified and from which $MgSiF_6$ hexahydrate can be recovered through crystallization.

In many cases, however, it is preferred to introduce enough water in the form of jets or sprays to trickle through the charge and dissolve and leach the engendered magnesium silicofluoride from the surfaces of the lumps of the mineral silicates. This procedure provides a more convenient method for the collection of the reaction product, and also removes it from the charge as rapidly as it is formed, so that the desired contact between the gases and the unreacted mineral is maintained. In the case of such water addition the resultant product is a solution of $MgSiF_6$ similar to the leachate mentioned above, which can be filtered, purified and concentrated to produce the solid crystalline hexahydrate $MgSiF_6 \cdot 6H_2O$.

In still other cases, the effluent gases may be passed into a tower provided with water sprays to capture the fluoric materials in acidic form, the resultant acid solution then being passed by gravity or otherwise through a bed of magnesium silicate mineral. In this case the resultant solution of $MgSiF_6$ will be similar to the solutions mentioned above and can be handled in the same way. If desired, the solution can be recirculated through the bed of the silicate mineral to increase the concentration of solute $MgSiF_6$.

It will be understood that any of the above mentioned solutions of $MgSiF_6$ can be purified in any suitable manner before being concentrated and crystallized. For example, the magnesium silicate materials often contain iron some of which may be carried by the $MgSiF_6$ solution and can be precipitated by the addition of MgO and separation through filtration.

For the production of hydrofluoric acid, the reaction products mentioned above are dissolved in concentrated sulphuric acid and the solution is distilled. When the anhydrous acid is desired, provision should be made to eliminate moisture from the distillation system. Thus, when the hexahydrate silicofluoride is the starting material, it should be preheated to drive off its water of crystallization. Also, the distillation system should be virtually free of moisture before and during the distillation. This can be accomplished by the proper proportion of concentrated sulphuric acid and by regulation of the temperature of the system during the distillation. It is possible, however, to distill hydrofluoric acid from the hexahydrate of means of sulphuric acid, provided the gases resultant from this distillation are passed through hot concentrated sulphuric acid or otherwise dehydrated.

The by-product of the distillation is a mixture of residual sulphuric acid, which carries the engendered magnesium sulphate, and a crystalline form of silica. The acidic solution of $MgSO_4$ can be separated readily from the silica through filtration, and the $MgSO_4$ then can be recovered by means of filtration or centrifuging, washing with an appropriate $SO_4$-charged medium, and neutralizing.

The solution of magnesium silico-fluoride can also be used as the starting material for reaction with ammonium hydroxide and subsequent production of hydrofluoric acid, as disclosed and claimed in my copending application filed concurrently herewith.

From the foregoing it will be evident that the invention accomplishes two principal objectives. It facilitates the collection of fluoric gases through the use of naturally occurring materials that are available in large quantities at low cost, with elimination of atmospheric contamination and concomitant detrimental effects upon plant and animal life. The invention also provides an economical means for the ready production of hydrofluoric acid, which material is essential to the chemistry of certain major industries, as stated above.

It will be understood that the invention is not restricted to the details of the foregoing description and that reference should be had to the appended claims for a definition of its limits.

What is claimed is:

1. A process for the recovery of the fluorine content of fluoric effluents given off during the treatment of fluorine-containing materials which process comprises the passing of said fluoric effluents in contact with a bed of crushed mineral magnesium silicate, thereby forming magnesium silicofluoride.

2. A process as defined in claim 1, wherein the reacted mineral magnesium silicate is subjected to distillation from sulphuric acid to evolve hydrofluoric acid.

3. A process as defined in claim 1, wherein the reacted mineral magnesium silicate is leached and the said magnesium silicofluoride is recovered from its resultant aqueous solution.

4. A process as defined in claim 3, wherein the solute magnesium silicofluoride is crystallized in hydrated form from said solution and then is dehydrated and subjected to distillation from sulphuric acid to evolve anhydrous hydrofluoric acid.

5. A process for the recovery of the fluorine content of fluoric effluents given off during the treatment of fluorine-containing materials and containing at least one fluoric constituent of the group consisting of silicon tetrafluoride, hydrofluosilicic acid, and hydrogen fluoride, which process comprises contacting said fluoric effluents with mineral magnesium silicate and water to form a solution of magnesium silicofluoride, and recovering the magnesium silicofluoride from said solution.

6. A process as defined in claim 5, wherein the effluents and water are passed through a bed of mineral magnesium silicate to form said solution.

7. A process as defined in claim 5, wherein the effluents are contacted with water and the resultant acidic aqueous solution is passed through a bed of mineral magnesium silicate to form said said solution.

8. A process as defined in claim 5, wherein the recovered magnesium silicofluoride is subjected to distillation from sulphuric acid to evolve hydrofluoric acid.

9. A process, as defined in claim 8, wherein the magnesium silicofluoride is recovered from its solution by means of crystallization and the resultant hydrated material is heated to drive off its water of crystallization and then subjected to distillation from sulphuric acid.

WALTER H. MacINTIRE.

REFERENCES CITED

The following references are of record in the file of this patent:

UNITED STATES PATENTS

| Number | Name | Date |
| --- | --- | --- |
| 1,250,216 | Peacock | Dec. 18, 1917 |
| 2,288,610 | Dean | July 7, 1942 |
| 2,349,556 | Kleckner | May 23, 1944 |